United States Patent
Moeller (12)

(10) Patent No.: US 10,298,321 B2
(45) Date of Patent: May 21, 2019

(54) IN-SERVICE TESTING OF OPTICAL SIGNAL-TO-NOISE RATIO

(71) Applicant: SubCom, LLC, Eatontown, NJ (US)

(72) Inventor: Lothar Moeller, Middletown, NJ (US)

(73) Assignee: SUBCOM, LLC, Eatontown, NJ (US)

(*) Notice: Subject to any disclaimer, the term of this patent is extended or adjusted under 35 U.S.C. 154(b) by 0 days.

(21) Appl. No.: 15/787,433

(22) Filed: Oct. 18, 2017

(65) Prior Publication Data

US 2019/0115976 A1   Apr. 18, 2019

(51) Int. Cl.
*H04B 10/532* (2013.01)
*H04B 10/079* (2013.01)

(52) U.S. Cl.
CPC . *H04B 10/07953* (2013.01); *H04B 10/07955* (2013.01); *H04B 10/532* (2013.01)

(58) Field of Classification Search
CPC ........ H04B 10/07953; H04B 10/07955; H04B 10/532
See application file for complete search history.

(56) References Cited

U.S. PATENT DOCUMENTS

| | | | |
|---|---|---|---|
| 6,795,607 B1* | 9/2004 | Archambault | H04B 10/0775 385/24 |
| 9,306,664 B1 | 4/2016 | Vusirikala et al. | |
| 9,608,722 B2 | 3/2017 | Liu et al. | |
| 2007/0098411 A1* | 5/2007 | Ghera | H04B 10/07955 398/177 |
| 2009/0290874 A1* | 11/2009 | Kaneko | H04B 10/0795 398/65 |
| 2010/0253936 A1* | 10/2010 | Xia | G01M 11/333 356/73.1 |
| 2014/0226978 A1* | 8/2014 | Flettner | H04B 10/07953 398/26 |
| 2015/0304025 A1* | 10/2015 | Liu | H04B 10/07951 398/28 |
| 2016/0261340 A1* | 9/2016 | Yang | H04B 10/07953 |

* cited by examiner

*Primary Examiner* — Shi K Li
*Assistant Examiner* — Omar S Ismail

(57) ABSTRACT

A system and method for in-service optical signal-to-noise ratio (OSNR) testing in optical communication systems. At least one OSNR test signal is combined onto an optical path with data channels. A receiver detects the received power of the OSNR test signal and provides output data representative of the OSNR of the system.

18 Claims, 3 Drawing Sheets

IN-SERVICE TESTING OF OPTICAL SIGNAL-TO-NOISE RATIO

TECHNICAL FIELD

The present disclosure relates to optical communication systems and, more particularly, to in-service testing of optical signal-to-noise ratio in optical communication systems.

BACKGROUND

In wavelength division multiplexing (WDM) optical communication systems a single optical fiber may be used to carry multiple optical signals. The multiple optical signals are multiplexed to form a multiplexed signal or WDM signal with each of the multiple signals being modulated on a separate channel. Each channel may be at an associated wavelength that is separated from adjacent channels by a defined channel spacing, e.g. according to a channel plan established by the International Telecommunications Union (ITU). The specific range of data channel wavelengths designed to be transmitted on the system is known as the system bandwidth. Systems may utilize their system bandwidth to carry a desired number of channels with a desired modulation format and bit rate.

One measure of the quality of the signals transmitted in a WDM optical communication system is optical signal-to-noise ratio (OSNR). OSNR is the ratio of the channel power to noise power the system bandwidth or in a portion of the system bandwidth, and can be used to predict the bit error rate (BER) of a channel. Conventionally, OSNR measurements for optical communication systems have been performed when the system is out-of-service, e.g. at initial installation of the system before transmission of optical signals.

Out-of-service OSNR testing has the significant drawback that transmission of data signals is terminated to perform the testing. Also, using OSNR measurements taken in an out-of-service mode at the initial installation of the system fails to account for changes in system performance during the life of the system. For example, as amplifiers within the system age the amplified spontaneous emission (ASE) noise generated by the amplifiers may change, which, in turn, results in a change of the actual system OSNR. Accordingly, attempts have been made to provide for in-service OSNR testing. Unfortunately, known systems and methods for performing in-service OSNR testing have not provided sufficient accuracy in determining OSNR.

BRIEF DESCRIPTION OF THE DRAWINGS

Reference should be made to the following detailed description which should be read in conjunction with the following figures, wherein like numerals represent like parts.

DETAILED DESCRIPTION

In general, a system and method consistent the present disclosure provides in-service OSNR testing in optical communication systems. A low-power OSNR test signal is combined onto an optical transmission path along with in-service data signals. An OSNR test signal receiver selects the OSNR test signal and provides OSNR measurement data. In some embodiments, the test signal may be polarization modulated at the transmitter and detected at the receiver using a lock-in amplifier. Also, in some embodiments, the test signal may be step-wise tuned across the system bandwidth to determine OSNR at various positions in the system bandwidth.

Figure 1:
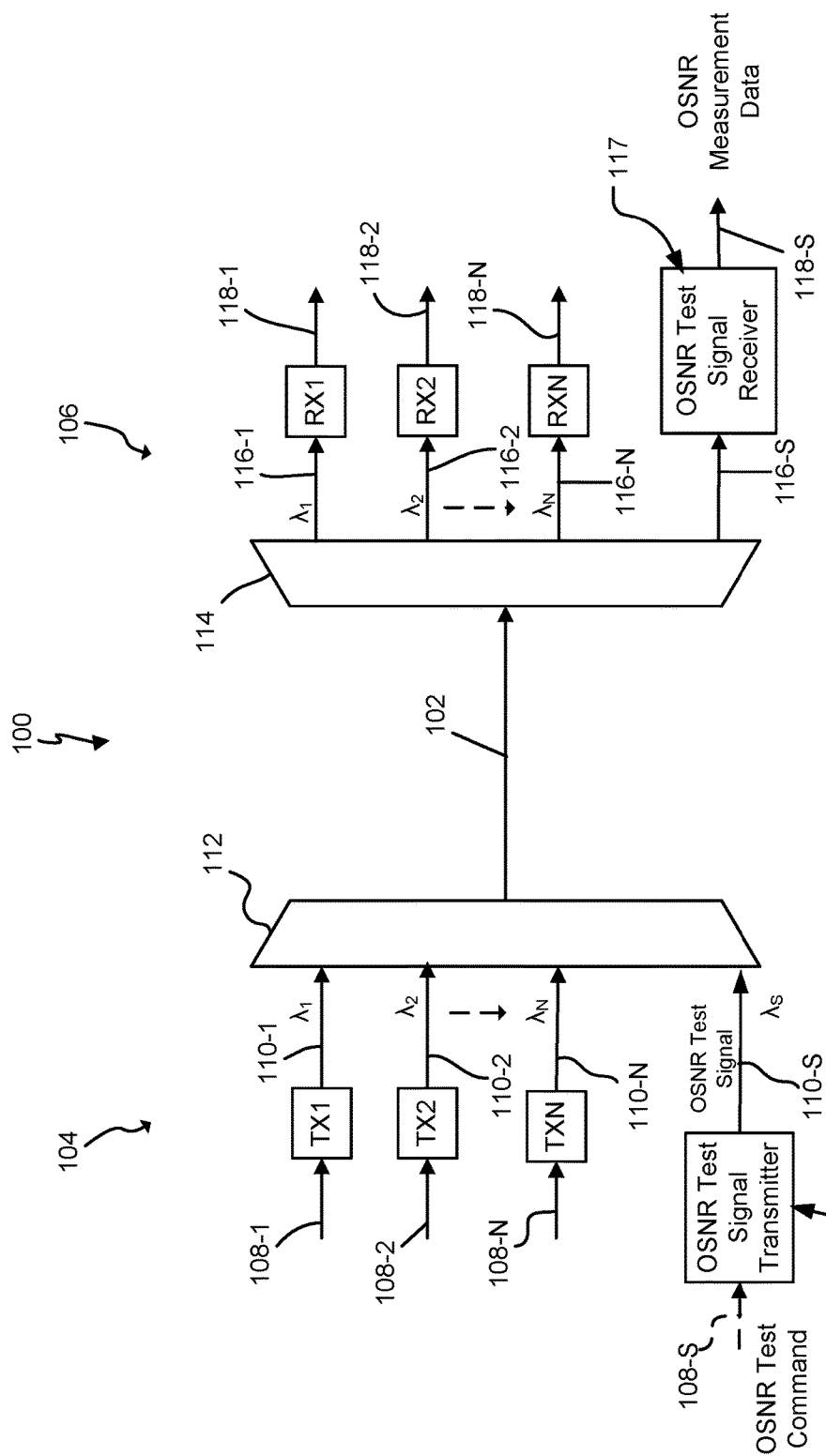
FIG. 1 is a block diagram of an embodiment of a system consistent with the present disclosure.

FIG. 1 is a simplified block diagram of one exemplary embodiment of a WDM transmission system 100 consistent with the present disclosure. The transmission system is configured to provide a plurality of data signals on associated optical data channels and one or more OSNR test signals on an optical information path 102 from a transmitting terminal 104 to one or more remotely located receiving terminals 106. The exemplary system 100 may be a long-haul submarine system configured for coupling the channels from a transmitter to a receiver that are separated by body of water by a distance of 5,000 km, or more, with the optical information path disposed within the body of water.

In the illustrated embodiment 100, each of a plurality of transmitters TX1, TX2 . . . TXN receives a data signal on an associated input port 108-1, 108-2 . . . 108-N, and transmits the data signal on an associated data channel wavelength $\lambda_1$, $\lambda_2$ . . . $\lambda_N$ with a channel spacing set according to a channel plan. The transmitters TX1, TX2 . . . TXN, of course, are shown in highly simplified form for ease of explanation. Those skilled in the art will recognize that each transmitter TX1, TX2 . . . TXN may include electrical and optical components configured for transmitting the data signal at its associated wavelength with a desired amplitude and modulation.

The illustrated embodiment 100 also includes an OSNR test signal transmitter 107 that transmits an OSNR test signal on a test signal wavelength $\lambda_S$ within the system bandwidth in a manner consistent with the present disclosure. In some embodiments, the test signal may be polarization modulated and may have a relatively low-power, i.e. compared to the power of the data signals. In some embodiments, for example, the test signal may be 20 dB or more lower than the power of the data signals. The OSNR signal may be transmitted in response to an OSNR test signal command, e.g. received from a network management system, or may be transmitted continuously or periodically by the OSNR test signal transmitter 107.

In some embodiments, the test signal wavelength $\lambda_S$ may be step-wise tuned to different wavelengths within the system bandwidth to measure OSNR at those wavelengths. For example, the OSNR test signal may be step-wise provided on plurality of different test signal wavelengths $\lambda_S$ positioned between the data channels to measure OSNR across the system bandwidth. Also, or alternatively, the test signal wavelength $\lambda_S$ may be placed at one or both of the edges of the system bandwidth.

The transmitted data signals and the OSNR test signal are respectively carried on a plurality of paths 110-1, 110-2 . . . 110-N and 110-S. In the illustrated embodiment, the data signals and OSNR test signal are combined into an aggregate signal on optical path 102 by a multiplexer 112. Alternatively, the data signals may be combined onto the optical path by the multiplexer 112 and the OSNR test signal may be combined onto the optical path using a separate coupler, e.g. 1/5 or 1/99 coupler.

The optical path 102 may include optical fiber waveguides, optical amplifiers, optical filters, dispersion compensating modules, and/or other active and passive components. As the aggregate signal propagates on the optical path 102, optical amplifiers on the path impart ASE noise to the data channels and the OSNR test signal. Other components along the optical path and/or impairments associated with the path may also contribute add noise to the data channels.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N, respectively. In the illustrated embodiment, the demultiplexer 114 also provides a portion of the entire system bandwidth on path 116-S. Alternatively, a portion of the system bandwidth may be provided on path 116-S using a coupler, e.g. 1/5 or 1/99 coupler.

The paths 116-1, 116-2 . . . 116-N are coupled to associated receivers RX1, RX2 . . . RXN. The receivers RX1, RX2 . . . RXN are configured to demodulate the data signals received thereby and provide an associated output data signal on an associated output path 118-1, 118-2, 118-3, 118-N, respectively. The path 116-S is coupled to an associated OSNR test signal receiver 117.

The OSNR test signal receiver 117 is configured to select the test signal wavelength $\lambda_S$ received on path 116-S using a narrow bandwidth filter to measure the relative power at the test signal wavelength compared to the baseline signal (data signal and ASE noise) at the test signal wavelength within the resolution bandwidth of the test signal receiver 117. The relative power at the test signal wavelength in the received signal compared to the baseline in the received signal may be compared to the relative power at the test signal wavelength in the transmitted signal compared to the baseline in the transmitted signal to provide a signal representative of the OSNR at the test signal wavelength.

Figure 2A:
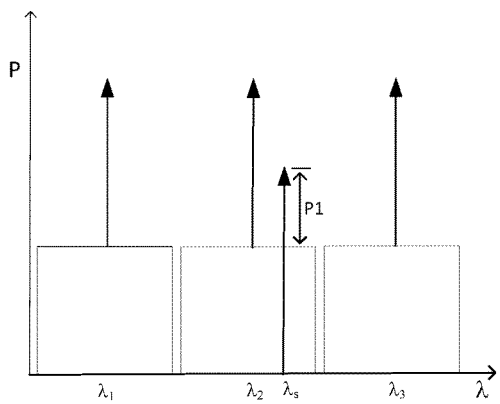
FIG. 2A diagrammatically illustrates optical power vs. wavelength to conceptually illustrates a transmitted signal consistent with the present disclosure wherein a test signal is transmitted with data signals for in-service OSNR.
Figure 2B:
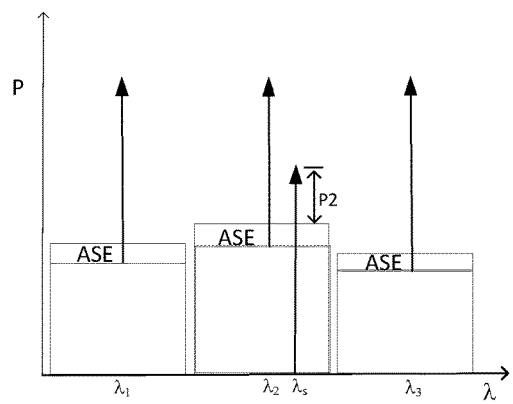
FIG. 2B diagrammatically illustrates optical power vs. wavelength to conceptually illustrates a received signal consistent with the present disclosure, when the transmitted signal is as shown in FIG. 2A.

FIGS. 2A and 2B, for example, diagrammatically illustrate optical power vs. wavelength for an aggregate signal transmitted by the transmitter 104 and the corresponding received signal received by the receiver 106, respectively. FIGS. 2A and 2B are highly simplified for ease of explanation. FIG. 2A illustrates three data channels including a data signal transmitted on center wavelengths $\lambda_1, \lambda_2 \ldots \lambda_N$ and baseline transmissions to the sides of each of the center wavelengths $\lambda_1, \lambda_2 \ldots \lambda_N$. In the illustrated embodiment, a single test signal is transmitted on a test signal wavelength $\lambda_s$ between the data signals at wavelengths $\lambda_2$ and $\lambda_3$. The test signal wavelength $\lambda_s$ should be spaced from each of the center wavelengths $\lambda_1, \lambda_2 \ldots \lambda_N$ of any channel to allow filtering of the test signal wavelength $\lambda_s$ separately from the center wavelength $\lambda_1, \lambda_2 \ldots \lambda_N$ of the channel. In some embodiments, for example, the test signal wavelength $\lambda_s$ may be spaced from the center wavelength $\lambda_1, \lambda_2 \ldots \lambda_N$ of any channel by at least about 8 GHz. As shown, at the transmitter, the power of the test signal is greater than the baseline transmission of the data channel by a known amount, P1.

The received signal, shown in FIG. 2B, includes ASE noise imparted to the data channels due to transmission of the transmitted signal along the transmission path. As shown, at the receiver, the power of the test signal is greater than the baseline signal at the receiver, which is the baseline transmission of the data channel plus the ASE noise imparted along the transmission, path by an amount, P2 that is less than P1. The difference between P1 and P2 is representative of the ASE noise imparted along the transmission path and is representative of the OSNR at the test signal wavelength $\lambda_s$. For simplicity and ease of explanation, embodiments described herein may be described with reference to FIGS. 2A and 2B and the powers P1 and P2. It is to be understood that the examples in FIGS. 2A and 2B are highly simplified and intended to provide a simple diagrammatic explanation of P1 and P2. Systems and methods consistent with the present disclosure are not intended to be limited to the specific configurations of data channels and test signals illustrated in FIGS. 2A and 2B.

With reference again to FIG. 1, the OSNR test signal receiver 117 measures the relative probe power of the test signal compared to the baseline and utilizes this measurement to provide OSNR measurement data on an output path 118-S that is representative of the OSNR at the test signal wavelength $\lambda_s$. The OSNR measurement data may, for example, include data representative of the received test signal power, noise power and/or the ratio of the measured test signal power to the noise power.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function.

Also, the system 100 may be configured to transmit any number of optical OSNR test signals on associated optical OSNR test signal wavelengths. For example, the OSNR test signal transmitter may be configured to provide an aggregate test signal on path 110-5 including OSNR test signals at a plurality of test signal wavelengths, e.g. between different data channels and the aggregate OSNR test signal may be provided on the optical path 102. In such an embodiment, the OSNR test signal receiver may be configured to filter each of the test signals and provide OSNR measurement data associated with each of the test signals. For ease of illustration and explanation, however, only a single OSNR test signal transmitter 107 for transmitting a single OSNR test signal (that may be step-wise tuned) is shown.

Also, in the illustrated embodiment 100, for ease of illustration and explanation the OSNR test signal transmitter 107 and the OSNR test signal receiver 117 are shown as being disposed at the transmitting 104 and receiving terminals 106, respectively. It is to be understood, however, that an OSNR test signal may originate from, or be received by, any device on the optical transmission path 102. For example, the OSNR test signals may originate from or be transmitted by an optical amplifier configuration, an optical add-drop multiplexer, a branch terminal, etc. Providing the OSNR test signal transmitter 107 and/or the OSNR test signal receiver 117 at devices along the optical transmission path 102 allows in-service measurement of OSNR for portions of the path, which may be useful in path optimization and/or fault analysis. In such embodiment, the OSNR measurement data may be provided to a network management system (NMS) on a supervisory channel of the system.

Figure 3:
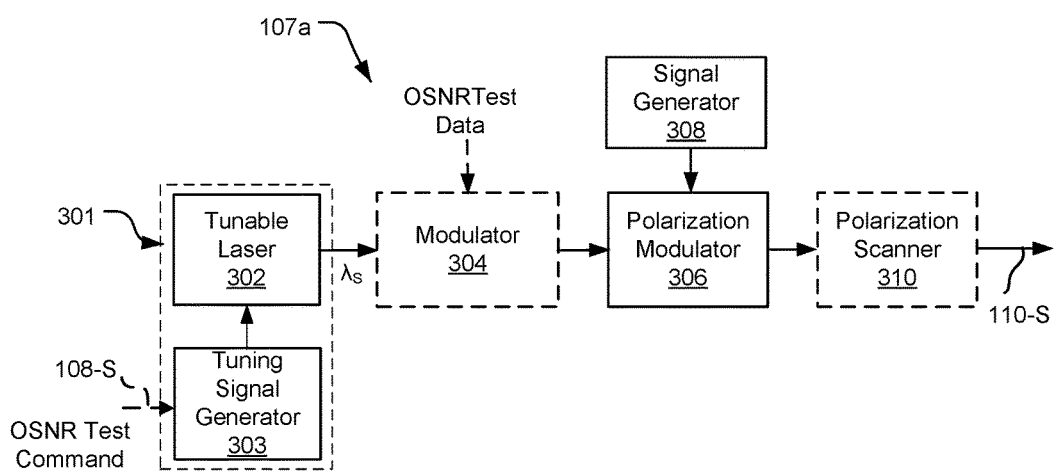
FIG. 3 is a block diagram of an embodiment of an OSNR test signal transmitter consistent with the present disclosure.

In light of the present disclosure, those of ordinary skill in the art will recognize a variety of OSNR test signal transmitter 107 and OSNR test signal receiver 117 configurations for transmitting and receiving test signals consistent with the present disclosure. FIG. 3, for example, is a simplified block diagram of one embodiment of an OSNR test signal transmitter 107a consistent with the present disclosure. The illustrated exemplary embodiment 107a includes a laser module 301 including a tunable laser 302 for providing an optical output at a test signal wavelength $\lambda_S$ and a tuning signal generator 303 for setting the test signal wavelength $\lambda_S$ of the tunable laser. An optional modulator 304 is coupled to the output of the tunable laser 302 for modulating OSNR test signal data on the test signal wavelength $\lambda_S$. A polarization modulator 306 is coupled to the tunable laser 302, e.g. through the optional modulator 304, for modulating the polarization of the output of the tunable laser 302 (or the optional modulator 304) in response to the output of a signal generator 308. An optional polarization scanner 310 is coupled to the output of the polarization modulator 306.

The tunable laser may take a known configuration and may be configured to provide step-wise tuning of the test signal wavelength $\lambda_s$ in response to the output of the tuning signal generator 303. The tuning output signal from the tuning signal generator 303 may be provided according to a pre-determined pattern (continuously or periodically) and/or in response to an OSNR test command signal. In some embodiments, the tuning signal generator 303 may be configured for step-wise tuning the test signal across the system bandwidth and/or across the bandwidth of one or more channels to facilitate measurement of OSNR at various positions in the system bandwidth and/or channels.

The optional modulator 304 may take a known configuration for modulating OSNR test signal data, e.g. a pseudo-random bit sequence, on the test signal wavelength $\lambda_S$ according to a desired modulation format. For example, the modulator 304 may be configured as a known on-off-keying (OOK) modulator, or may be configured to modulate data using the same modulation format used for one or more of the data channels. The output of the modulator 304 is a modulated signal having the test signal wavelength $\lambda_S$ and is modulated with the OSNR test signal data according to the modulation format applied by modulator 304.

The polarization modulator 306 may take a known configuration for modulating the polarization of the output of the tunable laser 302 or the modulated signal output of the modulator 304 in response to the output of the signal generator 308. For example, the polarization modulator 306 may be a known LiNbO3 polarization modulator. In some embodiments, the signal generator 308 may include a known frequency standard generating device, e.g. a known 10 MHz Rubidium standard, configured to provide a precise output signal to the polarization modulator 306 for modulating the polarization of the output of the tunable laser 302. For example, in some embodiments, the signal generator 308 may provide a sinusoidal output to the polarization modulator 306 to cause the polarization modulator 306 to modulate the polarization of the OSNR test signal so that the state of polarization (SOP) of the OSNR test signal rotates on a great circle of the Poincare sphere.

The optional polarization scanner 310 may take a known configuration for randomly modifying the plane of the Poincare sphere in which the SOP of the OSNR test signal resides. Use of the polarization scanner 310 in this way averages out the impact of polarization dependent loss (PDL) on the OSNR test signal. The output of the polarization modulator 306 or the polarization scanner 310 is provided on path 110-S as the OSNR test signal to be combined and launched on the optical transmission path 102 with the data signals.

Figure 4:
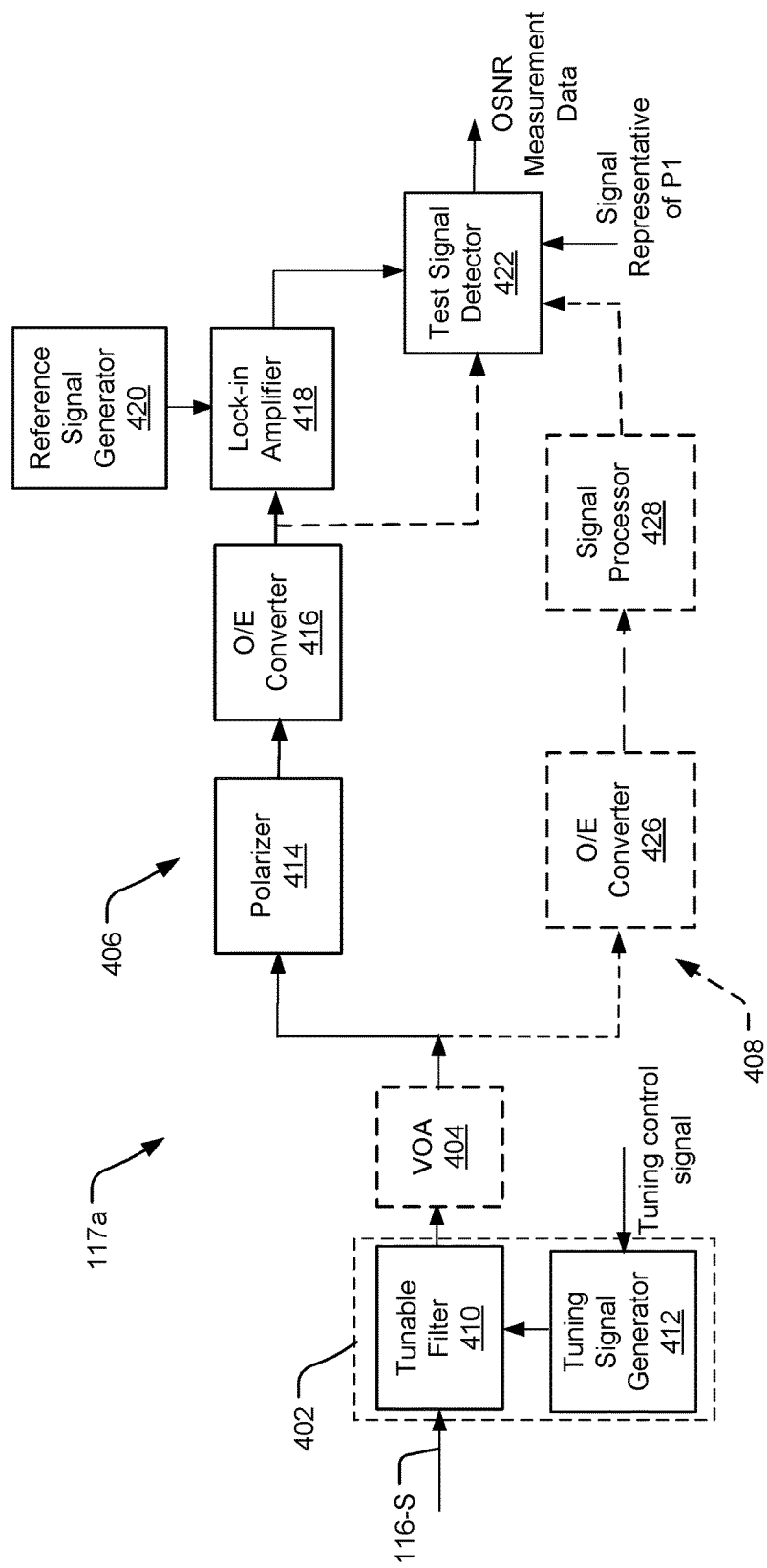
FIG. 4 is a block diagram of an embodiment of an OSNR test signal transmitter consistent with the present disclosure.

FIG. 4. is a simplified block diagram of one embodiment of an OSNR test signal receiver 117a consistent with the present disclosure useful for receiving a signal transmitted by the test signal transmitter 107a shown in FIG. 3. In general, the illustrated exemplary embodiment 117a includes an input filter module 402, an optional variable optical attenuator 404, a test signal detection portion 406 for detecting power in the received OSNR test signal and an optional polarization dependent loss (PDL) compensation portion 408 for detecting the amount of polarization dependent loss imparted to the signal on the transmission path.

The input filter module 402 includes a tunable filter 410 and a tuning signal generator 412. In the illustrated embodiment, a portion of the system bandwidth provided on path 116-S, e.g. at the output of the demultiplexer 114, is coupled to the tunable filter 410. The tuning signal generator 412 is configured to provide output signal to the tunable filter 410 for selectively tuning the tunable filter 410 to the test signal wavelength $\lambda_S$. The tuning output signal from the tuning signal generator 312 may be provided according to a pre-determined pattern (continuously or periodically) consistent with the pattern applied to the test signal wavelength $\lambda_S$ at the transmitter and/or in response to tuning control signal. The tuning control signal may be provided by a network management system (NMS) over a supervisory channel and may be configured to coordinate the passband of the tunable filter 410 with the test signal wavelength $\lambda_S$.

The tunable filter 410 narrowband filters the system bandwidth to select the test signal wavelength $\lambda_S$ and pass the test signal wavelength $\lambda_S$ to the test signal detection portion 406 and to the optional (PDL) compensation portion 408. In some embodiments, the output of the tunable filter 410 is coupled to the optional variable optical attenuator (VOA). The optional VOA may take a known configuration, e.g. for providing a constant output power to the test signal detection portion 406 and to the optional (PDL) compensation portion 408 and may be configured to amplify or attenuate the output of the tunable filter 410.

The output of the tunable filter 410 is coupled to the test signal detection portion 406, which, in the illustrated example, includes a polarizer 414, an optical-to-electrical (O/E) converter 416, a lock-in amplifier 418, a reference signal generator 420 and a test signal detector 422. The polarizer 414 may take a known configuration. Since the test signal was polarization modulated at the transmitter 107a, when the polarization of the test signal is orthogonal to the polarizer 414 the polarizer 414 provides no output. As the polarization of the test signal rotates away from orthogonal to the polarizer 414, the polarizer 414 output increases to a maximum that occurs when the polarization of the test signal and the polarizer 414 are aligned. The test signal thus produces a sinusoidal optical signal at the output of the polarizer 414 having the frequency of the polarization modulation imparted by the polarization modulator 306 at the transmitter 107a.

The output of the polarizer 414 is coupled to the O/E converter 416. The O/E converter 416 may take a known configuration, such as a photodiode, and produces an electrical output signal representative of the output of the polarizer 414. The majority of the electrical power in the output of the O/E converter 416 may be the result of beating between signal components of the data signals, and the test signal may contribute a relatively small amount of the power. To filter the test signal for measuring the extent to which the power of the test signal exceeds the baseline and ASE (P2 in FIG. 2B), the O/E converter 416 output is coupled to the lock-in amplifier 418.

The lock-in amplifier 418 may take a known configuration and is tuned to the polarization modulation frequency (set by the polarization modulator 306 in the transmitter 107*a*) of the test signal by the output of the reference signal generator 420. The reference signal generator 420 may include a known frequency standard generating device, e.g. a known 10 MHz standard, configured to provide a precise reference signal output to the lock-in amplifier 418 for tuning the lock-in amplifier 418 to the polarization modulation frequency of the test signal.

The output of the lock-in amplifier 418 is representative of the test signal power in the received signal and is coupled to the test signal detector 422. The difference between the test signal power at the output of the lock-in amplifier 418 and the total power at the input of the lock-in amplifier 418 is representative of the extent to which the test signal power exceeds the baseline power, i.e. P2 in FIG. 2B. The total power at the input to the lock-in amplifier 418 may be determined in a variety of ways. In some embodiments, as shown in dashed line in FIG. 4, the input to the lock-in amplifier 118 may be coupled directly to the test signal detector 422 and the test signal detector 422 may include a power detector, e.g. a known spectrum analyzer, for detecting the total power at the input to the lock-in amplifier 418. Alternatively, the lock-in amplifier 418 may be configured to provide two separate outputs, one output that indicates the test signal power and another output that indicates the total power at the input to the lock-in amplifier 418.

In the illustrated embodiment, the test signal detector 422 is configured to detect the power P2 in FIG. 2B from the test signal and the total power at the input to the lock-in amplifier. The test signal detector 422 is also configured to receive an input signal representative of P1, i.e. the extent to which the transmitted test signal is greater than the baseline transmission of the data channel. In some embodiments, P1 may be known or determined from the transmission parameters at the transmitter. In other embodiments, P1 may be detected in the aggregate signal at the transmitter using a detector as shown and described in connection with FIG. 4. The signal representative of P1 may be provided to the test signal detector 422 from the transmitter by a known network management system.

As discussed above with respect to the example shown in FIGS. 2A and 2B, the difference between P1 and P2 is representative of the ASE noise imparted along the transmission path and is representative of the OSNR at the test signal wavelength $\lambda_s$. The test signal detector may calculate this difference, e.g. in processor, and provide an output representative of the difference as the OSNR measurement data output from the receiver 117*a*, or as a component of the OSNR measurement data output from the receiver 117*a*.

The output of the tunable filter 410 may also be coupled to the optional PDL compensation portion 408. In general, the PDL compensation portion 408 may be particularly useful in embodiments wherein the optical transmission path imparts significant PDL to the aggregate signal. In general, PDL imparted by the transmission path acts like a weak polarizer to the signal. Since the test signal is polarization modulated, for transmission paths with high PDL accounting for the PDL imparted to the test signal can lead to more accurate measurement of OSNR in a system consistent with the present disclosure.

In the illustrated exemplary embodiment, the PDL compensation portion 408 includes an optical-to-electrical (O/E) converter 426 and a signal processor 428. The O/E converter 426 may take a known configuration, such as a photodiode, and produces an electrical output signal representative of the output of the tunable filter 410. Since the test signal is polarization modulated, for transmission paths that impart significant PDL the power at output of the O/E converter 426 varies between a maximum and a minimum power as the polarization of the test signal varies. The difference between the maximum and minimum power at the output of the O/E converter 426 is representative of the PDL imparted the transmission path. The signal processor 428 may be configured to detect the maximum and minimum power at the output of the O/E converter 426 and provide an output to the test signal detector 422 representative of the difference between the maximum and minimum power at the output of the O/E converter 426. To account for the PDL on the transmission path the test signal detector 422 may account for the output of the signal processor 428 before calculating the difference between P1 and P2.

According to one aspect of the disclosure there is thus provided a method comprising providing a plurality of data signals; combining an optical signal-to-noise ratio (OSNR) test signal with the data signals on an optical transmission path; receiving the OSNR test signal at an OSNR test signal receiver; detecting power of the OSNR test signal received at the OSNR test signal receiver; and providing OSNR measurement data output from the OSNR test signal receiver in response to the detected power of the OSNR test signal. In some embodiments, for example, the method may include comparing an extent to which the detected power of the OSNR test signal exceeds a baseline signal at the receiver with an extent to which a power of the OSNR test signal exceeds a transmitted baseline signal at the transmitter, and the providing OSNR measurement data output from the OSNR test signal receiver in response to the detected power of the OSNR test signal comprises providing the OSNR measurement data output in response to the comparing.

According to another aspect of the disclosure there is provided a method including: providing a plurality of data signals; generating a polarization modulated optical signal-to-noise ratio (OSNR) test signal; combining a the OSNR test signal with the data signals on an optical transmission path; receiving the OSNR test signal at an OSNR test signal receiver; passing the OSNR test signal through a polarizer at the OSNR test signal receiver; coupling the output of the polarizer to an optical-to-electrical (O/E) converter to provide an electrical signal representative of the test signal at an output of the O/E converter; coupling the output of the O/E converter to a lock-in amplifier; and providing OSNR measurement data output from the OSNR test signal receiver in response to an output of the lock-in amplifier.

According to another aspect of the disclosure there is provided a system comprising: a plurality of data signal transmitters, each of the data signal transmitters being configured for transmitting an associated data signal; at least one optical signal-to-noise ratio (OSNR) test signal transmitter, the OSNR test signal transmitter being configured for transmitting an associated OSNR test signal; and a combiner configured to combine the OSNR test signal on an optical transmission path with the data signals.

It will be appreciated by those skilled in the art that any block diagrams herein represent conceptual views of illustrative circuitry embodying the principles of the disclosure. The functions of the various elements shown in the figures, including any functional blocks, may be provided through the use of dedicated hardware as well as hardware capable of executing software in association with appropriate software.

Embodiments of the methods described herein may be implemented using a processor and/or other programmable device. To that end, the methods described herein may be implemented on a tangible, non-transitory computer readable medium having instructions stored thereon that when executed by one or more processors perform the methods. Thus, for example, the test signal detector 422 and/or the signal processor 428 may include a storage medium (not shown) to store instructions (in, for example, firmware or software) to perform the operations described herein. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Unless specifically stated otherwise, terms such as "operations," "processing," "comparing," "calculating," "determining," or the like, may refer to the action and/or processes of a processing system, hardwire electronics, or similar electronic computing device or apparatus, that manipulate and/or transform data represented as physical, such as electronic, quantities within, for example, registers and/or memories into other data similarly represented as physical quantities within the registers and/or memories.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection. As used herein, use of the term "nominal" or "nominally" when referring to an amount means a designated or theoretical amount that may vary from the actual amount.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method comprising:
providing a plurality of data signals;
combining an optical signal-to-noise ratio (OSNR) test signal with the data signals on an optical transmission path;
receiving the OSNR test signal at an OSNR test signal receiver;
detecting power of the OSNR test signal received at the OSNR test signal receiver;
providing OSNR measurement data output from the OSNR test signal receiver in response to the detected power of the OSNR test signal and
comparing an extent to which the detected power of the OSNR test signal exceeds a baseline signal at the receiver with an extent to which a power of the OSNR test signal exceeds a transmitted baseline signal at the transmitter, and wherein the providing OSNR measurement data output from the OSNR test signal receiver in response to the detected power of the OSNR test signal comprises providing the OSNR measurement data output in response to the comparing.

2. A method according to claim 1, the method further comprising step-wise tuning the wavelength of the OSNR test signal to different parts of a system bandwidth.

3. A method according to claim 1, wherein the OSNR test signal has an optical power 20 dB or more lower than the optical power of the data channels.

4. A method according to claim 1, the method further comprising imparting polarization modulation to the OSNR test signal before combining the OSNR test signal with the data signals on the optical transmission path.

5. A method according to claim 4, wherein the imparting polarization modulation to the OSNR test signal comprises modulating the polarization of the OSNR test signal so that the state of polarization (SOP) of the OSNR test signal rotates on a great circle of the Poincare sphere.

6. A method according to claim 5, further comprising polarization scanning the test signal to randomly modify the plane of the Poincare sphere in which the SOP of the OSNR test signal resides.

7. A method according to claim 1, further comprising passing the OSNR test signal through a polarizer at the OSNR test signal receiver, wherein the polarizer is configured to convert the OSNR test signal to an amplitude modulated electrical test signal.

8. A method according to claim 7, further comprising filtering the electrical test signal at the OSNR test signal receiver using a lock-in amplifier.

9. A method according to claim 1, wherein the data signals and the OSNR test signal are within a system bandwidth and the OSNR test signal is between wavelengths associated the data channels.

10. A method comprising:
providing a plurality of data signals;
generating a polarization modulated optical signal-to-noise ratio (OSNR) test signal;
combining a the OSNR test signal with the data signals on an optical transmission path;
receiving the OSNR test signal at an OSNR test signal receiver;

passing the OSNR test signal through a polarizer at the OSNR test signal receiver;

coupling the output of the polarizer to an optical-to-electrical (O/E) converter to provide an electrical signal representative of the test signal at an output of the O/E converter;

coupling the output of the O/E converter to a lock-in amplifier; and providing OSNR measurement data output from the OSNR test signal receiver in response to an output of the lock-in amplifier; and comparing an extent to which a detected power of the lock-in amplifier exceeds a baseline signal at the receiver with an extent to which a power of the OSNR test signal exceeds a transmitted baseline signal at the transmitter.

11. A method according to claim 10, and wherein the providing OSNR measurement data output from the OSNR test signal receiver in response to an output of the lock-in amplifier comprises providing the OSNR measurement data output in response to the comparing.

12. A system comprising:
a plurality of data signal transmitters, each of the data signal transmitters being configured for transmitting an associated data signal;
at least one optical signal-to-noise ratio (OSNR) test signal transmitter, the OSNR test signal transmitter being configured for transmitting an associated OSNR test signal;
a polarization modulator configured to impart polarization modulation to the OSNR test signal so that the state of polarization (SOP) of the OSNR test signal resides on a great circle of the Poincare sphere; and
a combiner configured to combine the OSNR test signal on an optical transmission path with the data signals.

13. A system according to claim 12, further comprising an OSNR test signal receiver configured to detect power of the OSNR test signal received at the OSNR test signal receiver.

14. A system according to claim 13, wherein the OSNR test signal receiver is configured to provide an OSNR measurement data output in response to the detected power of the OSNR test signal.

15. A system according to claim 12, wherein the OSNR test signal receiver comprises a polarizer configured to convert the OSNR test signal to an amplitude modulated test signal.

16. A system according to claim 12, wherein the OSNR test signal receiver comprises a lock-in amplifier configured to filter the test signal.

17. A system according to claim 12, wherein the data signals and the OSNR test signal are within a system bandwidth and wherein the OSNR test signal transmitter comprises a tunable laser configured to step-wise tune the wavelength of the OSNR test signal to a different parts of the system bandwidth.

18. A system according to claim 12, wherein the OSNR test signal transmitter further comprises a polarization scanner coupled to the polarization modulator, the polarization scanner configured to randomly modify the plane of the Poincare sphere in which the SOP of the OSNR test signal resides.

* * * * *